United States Patent
Sadamoto et al.

(10) Patent No.: US 7,681,760 B2
(45) Date of Patent: Mar. 23, 2010

(54) LIQUID CARTRIDGE

(75) Inventors: Atsushi Sadamoto, Kawasaki (JP); Yuusuke Sato, Bunkyo-ku (JP); Eiichi Sakaue, Shinagawa-ku (JP); Masato Akita, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/169,999

(22) Filed: Jul. 9, 2008

(65) Prior Publication Data

US 2008/0280187 A1 Nov. 13, 2008

Related U.S. Application Data

(62) Division of application No. 10/668,215, filed on Sep. 24, 2003, now abandoned.

(30) Foreign Application Priority Data

Sep. 30, 2002 (JP) ............... 2002-288067

(51) Int. Cl.
*H01M 8/04* (2006.01)
*B65D 83/00* (2006.01)
*B65D 83/76* (2006.01)
*G01F 23/00* (2006.01)

(52) U.S. Cl. ............... 222/95; 73/1.73; 73/1.79; 73/1.81; 222/45; 222/94; 222/103; 222/105; 429/34

(58) Field of Classification Search ............... 73/1.79, 73/1.81, 1.73; 220/530; 222/41, 45, 47, 222/103, 105, 94, 95; 429/34
See application file for complete search history.

(56) References Cited

U.S. PATENT DOCUMENTS

| 720,902 | A | | 2/1903 | Du Brau |
|---|---|---|---|---|
| 2,471,852 | A | | 5/1949 | Bau |
| 2,568,107 | A | | 9/1951 | Allen |
| 2,970,452 | A | | 2/1961 | Beckman et al. |
| 3,409,714 | A | | 11/1968 | Strugar, Jr. |
| 3,734,348 | A | | 5/1973 | White |
| 5,090,963 | A | | 2/1992 | Gross et al. |
| 5,325,081 | A | * | 6/1994 | Roberts ............... 338/2 |
| 5,872,319 | A | * | 2/1999 | Bruns et al. ............... 73/862.641 |
| 5,958,616 | A | * | 9/1999 | Salinas et al. ............... 429/41 |
| 6,502,931 | B2 | | 1/2003 | Udagawa et al. |
| 6,641,240 | B2 | * | 11/2003 | Hsu et al. ............... 347/7 |
| 6,739,578 | B2 | | 5/2004 | Barton et al. |
| 2003/0129464 | A1 | * | 7/2003 | Becerra et al. ............... 429/25 |

FOREIGN PATENT DOCUMENTS

| JP | 2-43290 | | 3/1990 |
|---|---|---|---|
| JP | 4-223058 | | 8/1992 |
| JP | 04-223058 | * | 8/1992 |
| JP | 7-187259 | | 7/1995 |
| JP | 8-85581 | | 4/1996 |
| JP | 2001-342898 | | 12/2001 |
| JP | 3278410 | | 2/2002 |
| KR | 1999-0088164 | | 12/1999 |

* cited by examiner

*Primary Examiner*—Jerry Lorengo
*Assistant Examiner*—Jared Wood
(74) *Attorney, Agent, or Firm*—Oblon, Spivak, McClelland, Maier & Neustadt, L.L.P.

(57) ABSTRACT

A liquid cartridge for supplying liquid to an external device connected therewith is provided with a casing, a partition member movably fitted in the casing, which partitions the casing into a first chamber and a second chamber, an outlet port communicating between the first chamber and the external device and a pressure unit housed in the second chamber, which presses the partition member so as to discharge the liquid out of the outlet port.

17 Claims, 9 Drawing Sheets

LIQUID CARTRIDGE

CROSS-REFERENCE TO RELATED APPLICATIONS

This application is a divisional of U.S. application Ser. No. 10/668,215 filed Sep. 24, 2003, and is based upon and claims the benefit of priority from the prior Japanese Patent Application No. 2002-288067 (filed Sep. 30, 2002); the entire contents of each of which are incorporated herein by reference.

BACKGROUND OF THE INVENTION

1. Field of the Invention

The present invention relates to a liquid cartridge for housing and discharging liquid, which can stably discharge the liquid out with substantially no rest, no matter how the cartridge is directed.

2. Description of the Related Art

It is necessary for a device provided with an apparatus employing liquid, such as a fuel cell, to be equipped with a liquid cartridge. The liquid cartridge should be accompanied with feeding means for feeding the liquid, such as a pump. In a case where the pump is employed for feeding the liquid, usually, a strainer connected to the pump is inserted into the liquid housed in the cartridge so that the liquid is extracted through an end of the strainer. Some issues are raised when the liquid cartridge is applied to mobile devices.

Lightweight and compact constitutions are required for the mobile devices due to them carried around. The pump may cause a severe weight gain in mobile devices. Additionally, the mobile devices are carried around so as to be oriented in a variety of directions. Thus, the strainer may be displaced from a proper position in the liquid, therefore it may happen that the end of the strainer can become disposed into a bubble in the liquid. In such cases, the supply of the liquid comes to have a problem and malfunction of the device can be induced.

Japanese Patent Application Laid-Open No. H4-223058 discloses a liquid cartridge which per se includes discharging means for discharging the liquid so as to omit the pump and the strainer.

SUMMARY OF THE INVENTION

The liquid cartridge disclosed in the Japanese Patent Application Laid-Open No. H4-223058 is configured so as to discharge the liquid by means of an elastic membrane made of rubber or such for itself. Because the pump and the strainer are omitted so that the cartridge is formed in a lightweight and compact constitution, the cartridge has an advantage in a case of an application to a mobile device. The cartridge further has an advantage that the cartridge can discharge the liquid no matter how the cartridge is directed. However, the elastic membrane is easily degraded caused by repeating utilization or aging. Additionally, capacity of the cartridge is limited by the elastic limit of the elastic membrane so that a large capacity is difficult to obtain.

The present invention is achieved in view of solving the above problem.

According to a first aspect of the invention, a liquid cartridge for supplying liquid to an external device connected therewith is provided with a casing, a partition member movably fit in the casing, the partition member partitioning the casing into a first chamber and a second chamber, an outlet port communicating between the first chamber and the external device and a pressure unit housed in the second chamber, the pressure unit pressing the partition member so as to discharge the liquid out of the outlet port.

According to a second aspect of the invention, a liquid cartridge for supplying liquid to an external device connected therewith is provided with a casing, a liquid housing body housed in the casing, the liquid housing body housing the liquid, an outlet port communicating between the liquid housing body and the external device and a pressure unit housed in the second chamber, the pressure unit pressing the liquid housing body so as to discharge the liquid out of the outlet port.

According to a third aspect of the invention, a fuel cell system is provided with a fuel cell having one or more anodes, one or more cathodes and electrolytes respectively put therebetween, a pump feeding air to the cathodes and a liquid cartridge supplying liquid to the anode. The liquid cartridge is provided with a casing, a partition member movably fit in the casing, the partition member partitioning the casing into a first chamber and a second chamber, an outlet port communicating between the first chamber and the external device and an inlet port introducing air fed by the pump into the second chamber so as to press the partition member so that the fuel is discharged out of the outlet port.

According to a fourth aspect of the invention, a fuel cell system is provided with a fuel cell having one or more anodes, one or more cathodes and electrolytes respectively put therebetween, a pump feeding air to the cathodes and a liquid cartridge supplying liquid to the anode. The liquid cartridge is provided with a casing, a liquid housing body housed in the casing, the liquid housing body housing the liquid, an outlet port communicating between the liquid housing body and the external device and an inlet port introducing air fed by the pump into the casing so as to press the liquid housing body so that the fuel is discharged out of the outlet port.

According to a fifth aspect of the invention, a fuel cell system is provided with a fuel cell having one or more anodes, one or more cathodes and electrolytes respectively put therebetween, a pump feeding air to the cathodes and a liquid cartridge supplying liquid to the anode. The liquid cartridge is provided with a casing, a partition member movably fit in the casing, the partition member partitioning the casing into a first chamber and a second chamber, an outlet port communicating between the first chamber and the external device, a pressure unit housed in the second chamber, the pressure unit pressing the partition member so as to discharge the liquid out of the outlet port, and an inlet port introducing exhaust from the cathode into the second chamber.

DETAILED DESCRIPTION OF THE INVENTION

Embodiments of the present invention will be described hereinafter. The below embodiments are described as examples in which a liquid cartridge is employed as a fuel tank for fuel supply to a fuel cell, however, the application is not limited to the examples. The liquid cartridges can be applied to a variety of examples for liquid supply.

A first embodiment of the present invention will be described hereinafter with reference to FIGS. 1A and 1B.

A liquid cartridge 1 of the first embodiment is provided with a casing 3, a pressure unit 15, a partition member 5, 13 and an outlet port 7. The casing 3 is provided with an upper wall 3A, a lower wall 3B and a circumferential wall 3C so as to envelop an inside thereof. The pressure unit 15 is connected to the upper wall 3A and an opposite end thereof is connected to a partition 13. An envelope 5 is liquid-tightly connected with a circumference of the partition 13 and the lower wall 3B so that the inside of the casing 3 is partitioned into a first chamber 9 and a second chamber 11.

Figure 1A:
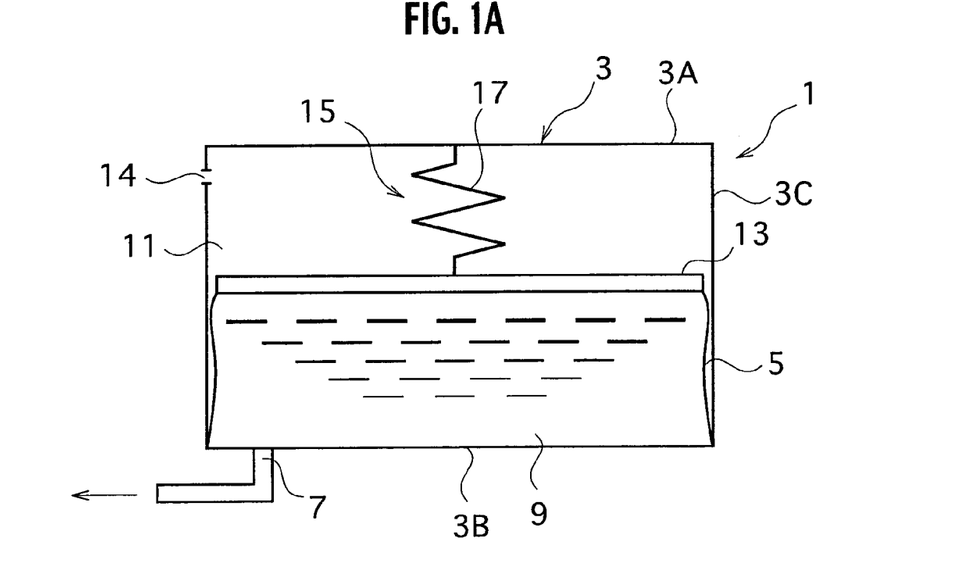
FIG. 1A is a schematic drawing of a liquid cartridge according to a first embodiment of the present invention.
Figure 1B:
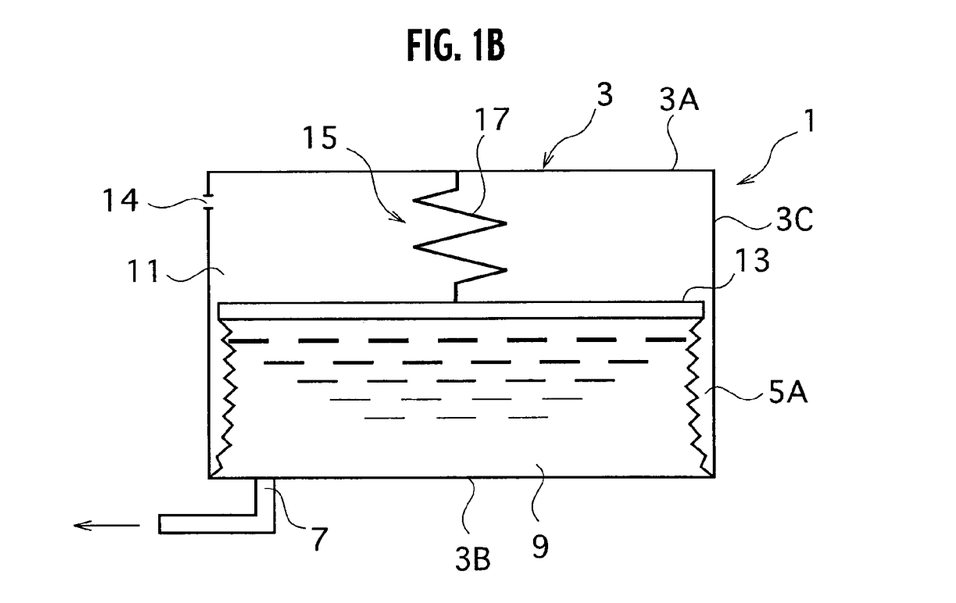
FIG. 1B is a schematic drawing of a liquid cartridge according to a modification of the first embodiment of the present invention.

The envelope 5 is made of flexible resin and may be formed into a membrane shape as shown in FIG. 1A or a bellows shape as shown in FIG. 1B. The envelope 5 is formed in a liquid-tight manner and liquid-tightly adhered to both the partition 13 and the lower wall 3B so that the first chamber 9 can pool liquid therein. The partition 13 is a movable plate formed in a shape substantially the same as a cross-sectional shape of the inside of the casing 3. A material and thickness thereof are appropriately selected so that the partition 13 has enough stiffness to support pressure added by the pressure unit 15. The partition 13 may be formed integrally with the envelope 5 or formed separately from the envelope 5 so as to slidably and liquid-tightly contact with the envelope 5. The liquid is an organic compound, which can be applied as a fuel for a fuel cell or such, and is in a liquid phase at a room temperature. Methanol, dimethyl ether, formic acid and an aqueous solution thereof can be exemplified.

The pressure unit 15 is housed in the second chamber 11 and is configured to press the partition 13 so as to discharge the liquid to the outlet port 7. The pressure unit 15 is provided with an elastic body 17 such as a coil spring as shown in FIG. 1A or 1B. The elastic body 17 is compressed in advance so as to have repulsive force. The partition 13 is forced downward, in the drawing, by the repulsive force.

The outlet port 7 is connected to an external device. The external device is provided with a switching valve configured to be switched between open and closed. Flow of the liquid into the external device can be controlled by means of properly switching the switching valve.

The liquid is charged into and fills the first chamber 9. When the switching valve is operated so that the outlet port 7 is opened, the pressure unit 15 presses the partition 13 so as to discharge the liquid through the outlet port 7 to the external device. The liquid cartridge 1 can discharge the liquid no matter how the direction thereof is oriented.

In a case where the liquid is fed out, the liquid can be re-charged through the outlet port 7 so that the liquid cartridge 1 can be repeatedly reused.

The discharging of the liquid is achieved by means of the repulsive force of the pressure unit 15, therefore it is not necessary for the partition 13 and the envelope 5 to be significantly deformed. Accordingly, their degradation is prevented so that long life of the liquid cartridge 1 can be gained.

The casing 3 is further provided with an inlet port 14. The second chamber 11 tends to be given negative pressure when the partition 13 is pressed so as to move, however, air is introduced through the inlet port 14 so as to dissolve the negative pressure. More preferably, the inlet port 14 is configured to communicate with a cathode of the fuel cell. The cathode exhausts gas including humidity generated by fuel cell reaction and a portion of the fuel penetrating from the anode. In a case where the inlet port is connected to the cathode, these can be recycled and reused.

Figure 2:
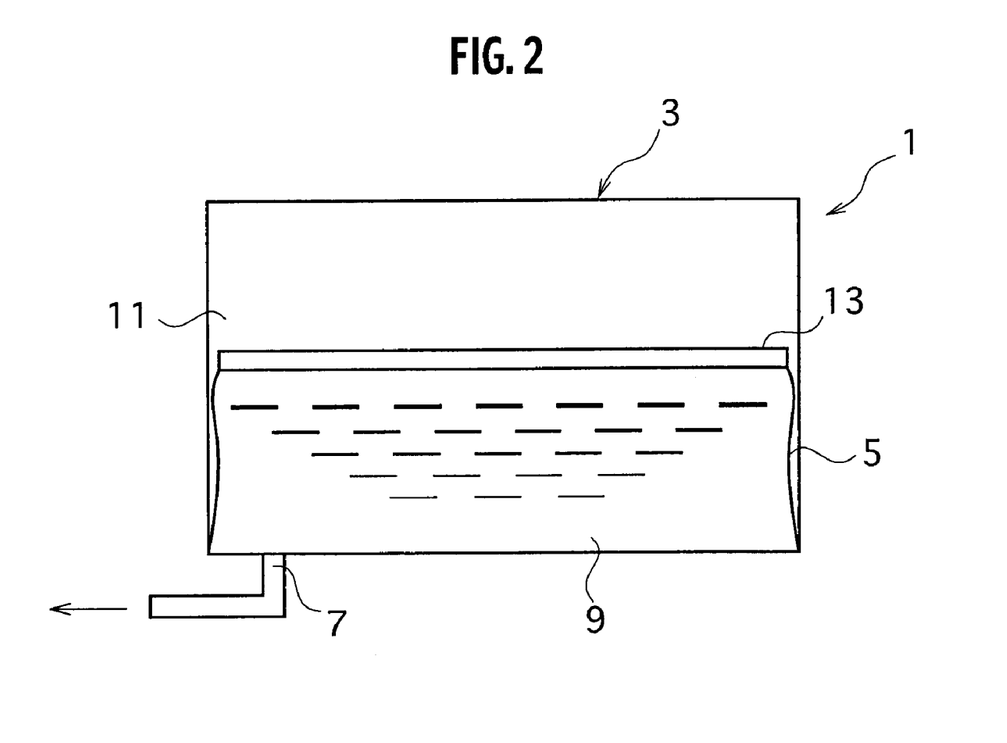
FIG. 2 is a schematic drawing of a liquid cartridge according to a second embodiment of the present invention.

A second embodiment of the present invention will be describe hereinafter with reference to FIG. 2. In the below description, the same elements as the above first embodiment are referenced with the same numerals and the detailed descriptions are omitted. Mainly differences will be described.

A casing 3 according to the second embodiment does not have the inlet 14 so that the second chamber 11 is hermetically closed. Additionally, the casing 3 does not include the elastic body 17 and, instead, a compressed gas such as LPG is encapsulated therein so as to carry out the same function as the pressure unit 15. Therefore the same effect is gained as the first embodiment.

Figure 3A:
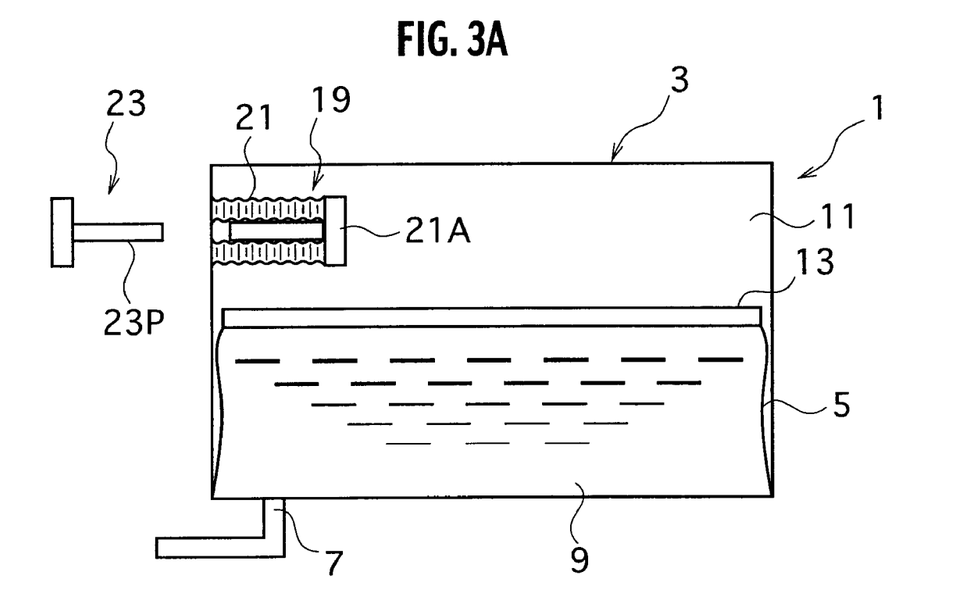
FIG. 3A is a schematic drawing of a liquid cartridge according to a third embodiment of the present invention, showing a state before installing the liquid cartridge to a device.
Figure 3B:
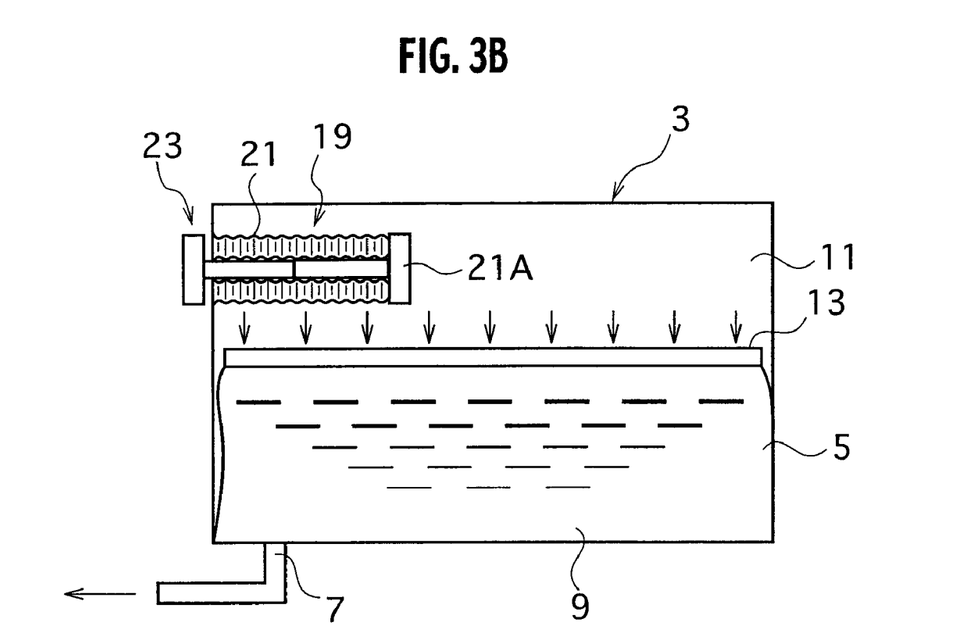
FIG. 3B is a schematic drawing of a liquid cartridge according to the third embodiment of the present invention, showing a state after installing the liquid cartridge to the device.

A third embodiment of the present invention will be described hereinafter with reference to FIGS. 3A and 3B. In the below description, the same elements as the above first or second embodiment are referenced with the same numerals and the detailed descriptions are omitted. Mainly differences will be described.

A second chamber 11 of a liquid cartridge 1 according to the third embodiment is hermetically closed and is provided with volume inflation means 19 so as to have an equivalent function of the pressure unit 15. The volume inflation means 19 is provided with an extensible bellows 21 and a movable member 21A and configured to receive an invagination member 23. The invagination member 23 is provided with an invagination pin 23P at a distal end thereof and installed to the external device to which the liquid cartridge 1 is applied. When the liquid cartridge 1 is installed in the external device, the invagination pin 23P is invaginated into the volume inflation means 19 as shown in FIG. 3B. An end tip of the invagination pin 23P presses the movable member 21A so as to extend the bellows 21, thereby the volume inflation means 19 inflates toward an inside of the casing 3.

Accompanying inflation of the volume inflation means 19, gas in the second chamber 11 is compressed so as to have the same function as the pressure unit 15. Therefore the present embodiment has a similar effect to the first embodiment.

A fourth embodiment of the present invention will be described hereinafter with reference to FIGS. 4A and 4B. In the below description, the same elements as any one of the above first to third embodiments are referenced with the same numerals and the detailed descriptions are omitted. Mainly differences will be described.

Figure 4A:
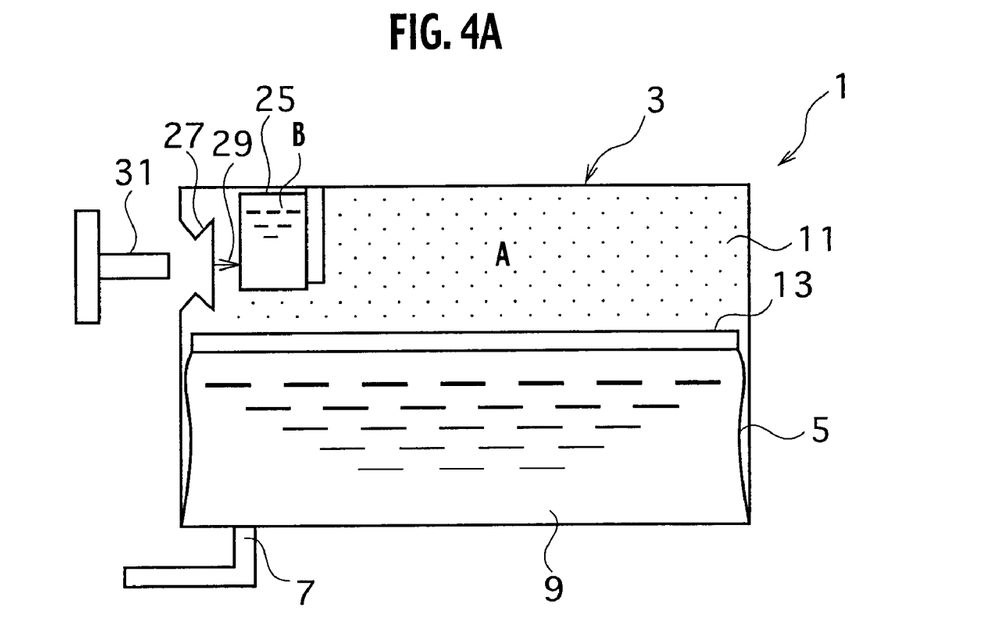
FIG. 4A is a schematic drawing of a liquid cartridge according to a fourth embodiment of the present invention, showing a state before installing the liquid cartridge to a device.
Figure 4B:
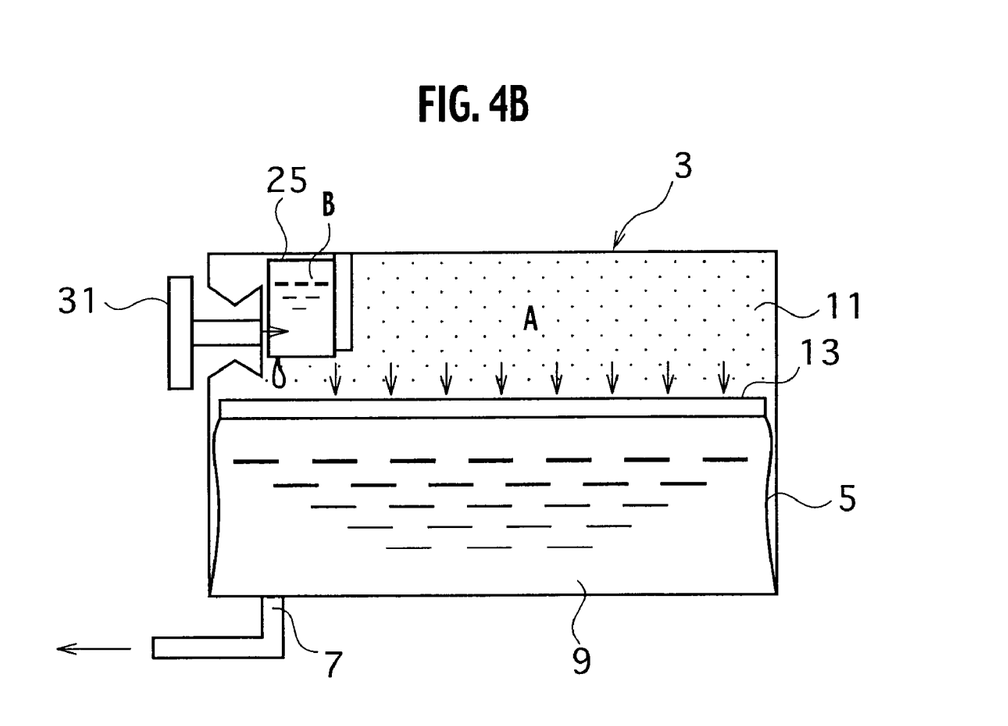
FIG. 4B is a schematic drawing of a liquid cartridge according to the fourth embodiment of the present invention, showing a state after installing the liquid cartridge to the device.
Figure 5A:
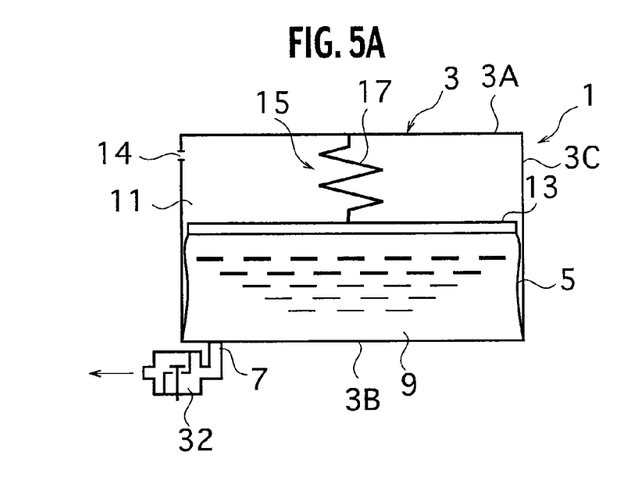
FIG. 5A is a schematic drawing of a liquid cartridge according to a modification of the first embodiment of the present invention.
Figure 5B:
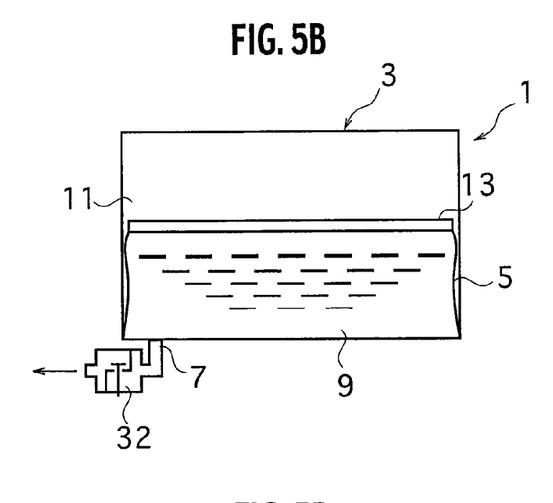
FIG. 5B is a schematic drawing of a liquid cartridge according to a modification of the second embodiment of the present invention.
Figure 5C:
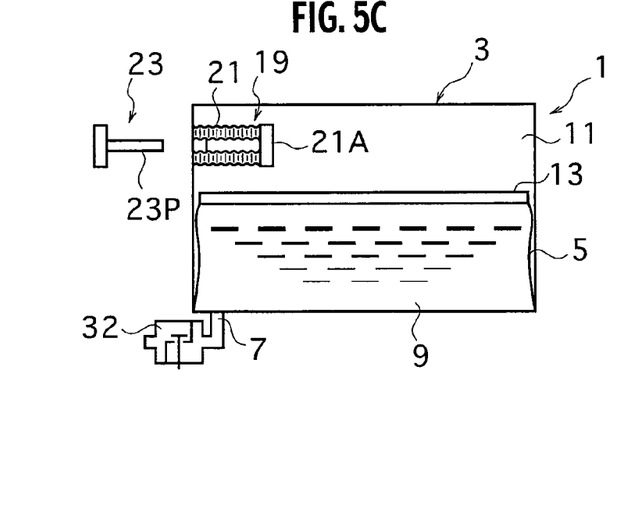
FIG. 5C is a schematic drawing of a liquid cartridge according to a modification of the third embodiment of the present invention.
Figure 5D:
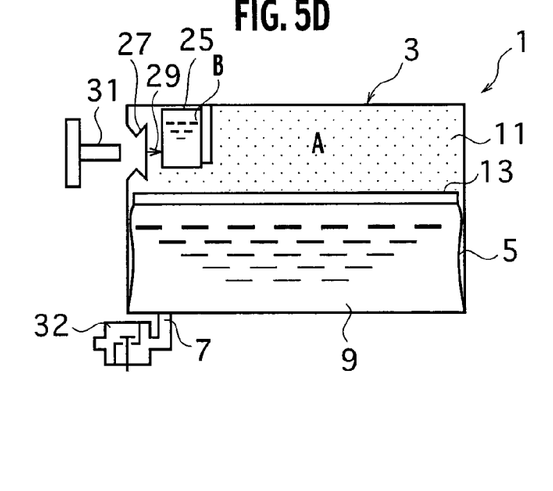
FIG. 5D is a schematic drawing of a liquid cartridge according to a modification of the fourth embodiment of the present invention.

A second chamber 11 of a casing 3 of a liquid cartridge according to the fourth embodiment is hermetically closed, as shown in FIG. 4A, similar with the above second and third embodiments. Ingredients A and B are housed in the second chamber 11. The ingredient B is housed in a housing body 25 so as to be separated from the ingredient A. The casing 3 is provided with a flexible portion 27 so that the flexible portion 27 is closed to the housing body 25. The flexible portion 27 is further provided with a sticking member 29.

The combination of the ingredients A and B is appropriately selected so as to inflate when the ingredients A and B are mixed. A combination of sodium hydrogen carbonate or calcium carbonate as A and hydrochloric acid as B can be exemplified. According to the exemplified combination, carbon dioxide is generated by the following chemical reaction so that the gas inflates.

$NaHCO_3+HCl \rightarrow NaCl+H_2O+CO_2$; or $CaCO_3+HCl \rightarrow CaCl_2+H_2O+CO_2$ However, the present embodiment is not limited to the above example. Any proper combinations of inflatable ingredients may be applied.

When the liquid cartridge 1 is installed to an external device, an invagination member 31 provided for the external device invaginates into the flexible portion 27 so that the sticking member 29 sticks the housing body 25. Then the ingredients A and B are mixed and give inner pressure to the second chamber 11 so as to discharge the liquid. Therefore the present embodiment has a similar effect to the first embodiment.

The liquid cartridge 1 of the first to fourth embodiments can be modified as shown in FIGS. 5A to 5D. An outlet port 7 of each of the liquid cartridges 1 of the modifications is further provided with a check valve 33. The check valve 33 may be configured so as to be closed in a steady state and be opened only when the liquid cartridge 1 is installed to the external device.

A fifth embodiment of the present invention will be described hereinafter with reference to FIGS. 6A and 6B. In the below description, the same elements as any one of the above first to fourth embodiments are referenced with the same numerals and the detailed descriptions are omitted. Mainly differences will be described.

A liquid cartridge 1 of the fifth embodiment is provided with a casing 33 formed in a thin box shape and a lid portion 35. The lid portion 35 is detachably attached with the casing 33.

Figures 6A, 6B:
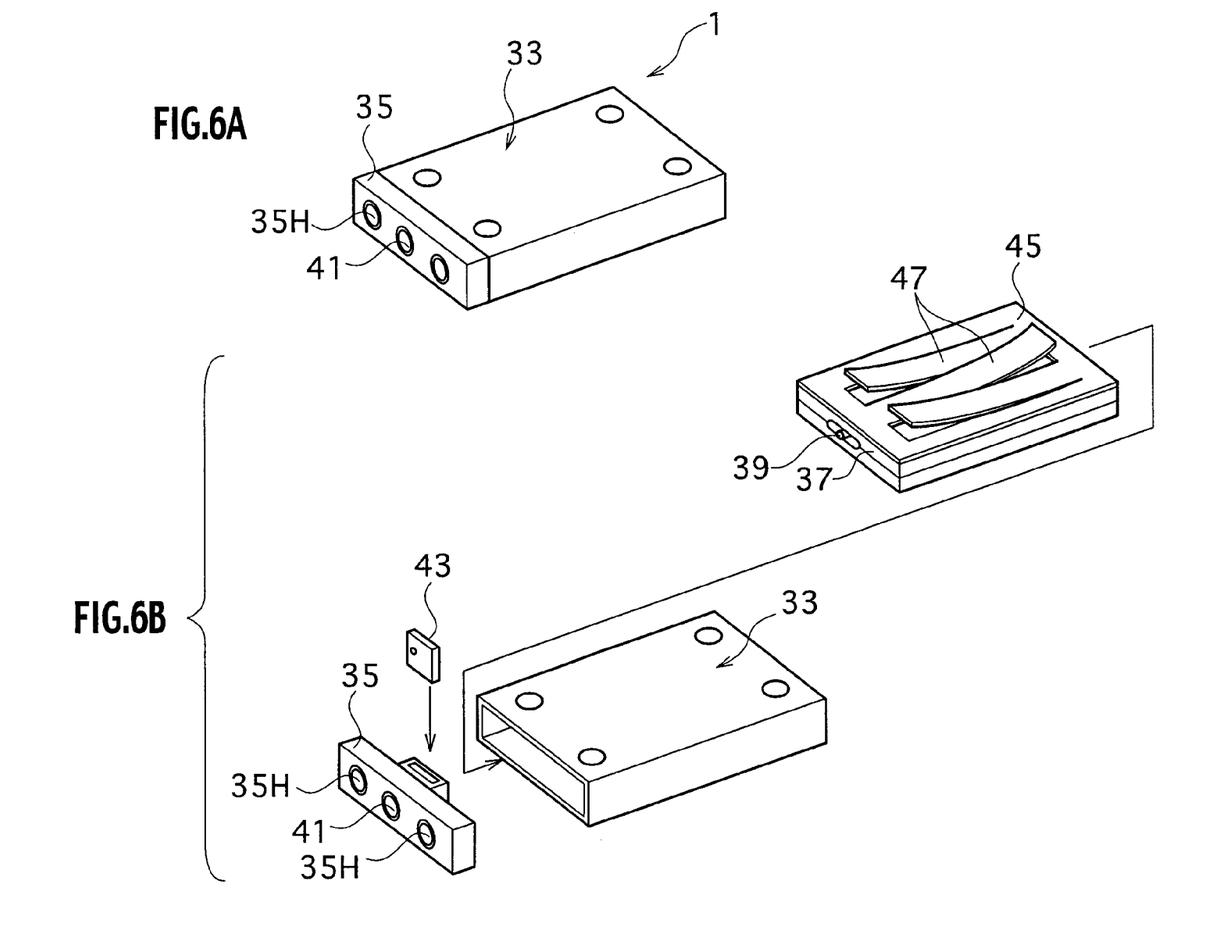
FIG. 6A is a perspective view of a liquid cartridge according to a fifth embodiment of the present invention.
FIG. 6B is an exploded perspective view of the liquid cartridge according to the fifth embodiment of the present invention.

A liquid housing body 37 for housing the liquid is housed in the casing 33 as shown in FIG. 6B. The liquid housing body 37 is made of polyethylene or such material so as to have elasticity and is formed in a shape correspondent to the casing 33. The liquid housing body 37 is provided with a discharging port 39 and the lid portion 35 is provided with a regulator 43 at an inside of an outlet port 41 thereof. The discharging port 39 is configured to be connected with the regulator 43. The outlet port 41 is configured to be opened and closed.

The liquid housing body 37 is provided with a pressure member 45 at one of the faces thereof. The pressure member 45 is provided with a cut-and-raised piece 47 which acts as a leaf spring. When the liquid housing body 37 is housed in the casing 33, the liquid housing body 37 is constantly given pressure.

After housing the liquid housing body 37 in the casing 33, when the lid portion 35 is attached with the casing 33 and the outlet port 41 is opened, the cut-and-raised piece 47 gives pressure to the liquid so as to discharge the liquid through the regulator 43 out of the outlet port 41. Discharging pressure tends to fade along with discharging the liquid because the pressure given by the cut-and-raised piece 47 is gradually decreased. However, the regulator 43 regulates the discharging pressure so as to be substantially constant so as to stably discharge the liquid out with substantially no rest.

The lid portion 35 is further provided with openings 35H so as to allow the flowing of air into the casing 33. Therefore the inside of the casing 33 must not be given negative pressure even when the liquid is fed out.

Figure 7A:
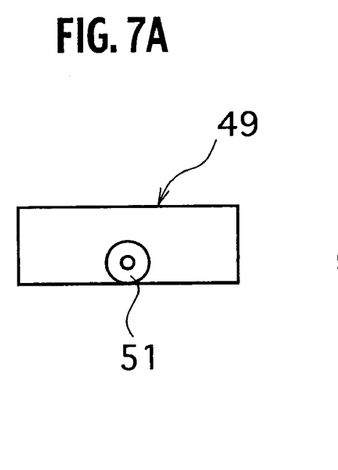
FIG. 7A is a schematic side view of a liquid cartridge according to a sixth embodiment of the present invention.
Figure 7B:
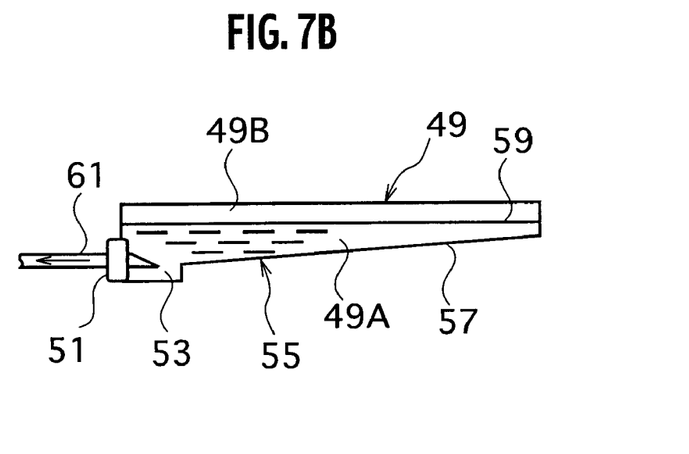
FIG. 7B is a schematic front view of the liquid cartridge according to the sixth embodiment of the present invention.

A sixth embodiment of the present invention will be described hereinafter with reference to FIG. 7. In the below description, the same elements as any one of the above first to fifth embodiments are referenced with the same numerals and the detailed descriptions are omitted. Mainly differences will be described.

A casing 49 of the sixth embodiment is provided with a plug 51 made of rubber or such material and a reservoir 53 for pooling the liquid is formed in a vicinity of the plug 51. A wall surface 55 of the casing 49 is slanted toward the reservoir 53 and a longitudinal section of the casing 49 has a wedge shape which shrinks along with departing from the reservoir 53 toward a distal end thereof.

An inside of the casing 49 is partitioned into a first chamber 49A and a second chamber 49B by a partition 59. The liquid is filled in the first chamber 49A and a gas such as LPG is filled in the second chamber 49B in a compressed manner.

The partition 59 is formed so as to have enough strength to be tolerant of the gas pressure as well as elasticity for proper deformation.

According to the above constitution, when the casing 49 is installed in the external device, a needle-like pipe 61, which the external device is provided with, penetrates the plug 51 so that the pipe 61 communicates with the first chamber 49A. The liquid housed in the first chamber 49A is given pressure by the compressed gas of the second chamber 49B so that the liquid is discharged outward via the plug 51 and the pipe 61.

Along with discharging the liquid, the partition 59 starts to touch with the wall surface 55 at a distal position from the reservoir 53. The position where the partition 59 touches with the wall surface 55 moves toward the reservoir 53 because the wall surface 55 is slanted. Thereby the liquid is discharged from the first chamber 40 with substantially no rest as if squeezed out.

The above-described constitution can also be applied to the casing 33 of the fifth embodiment or casing 3 of any one of the first to fourth embodiments.

Figure 8:
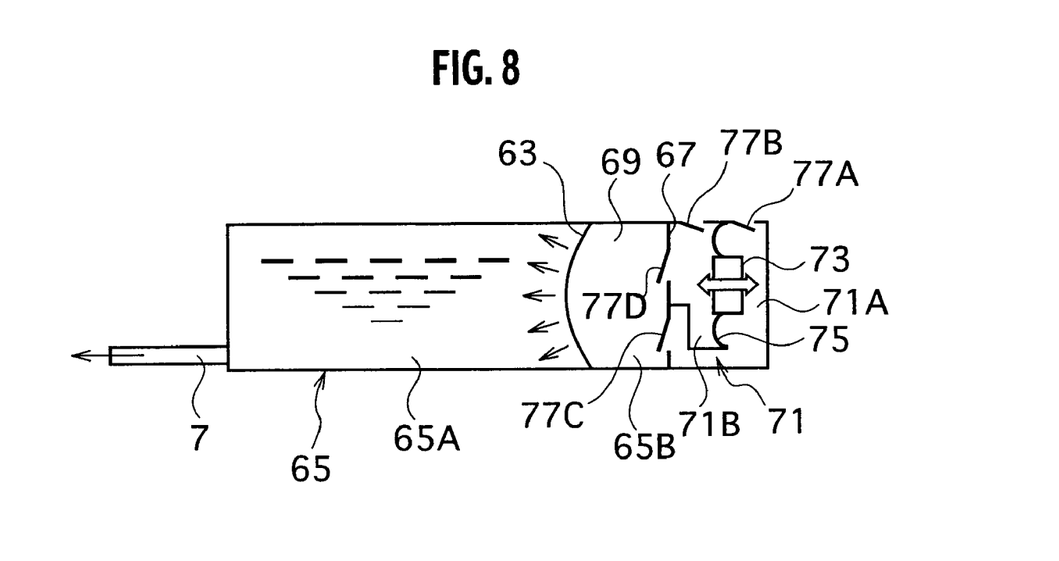
FIG. 8 is a schematic drawing of a liquid cartridge according to a seventh embodiment of the present invention.

A seventh embodiment of the present invention will be described hereinafter with reference to FIG. 8. In the below description, the same elements as any one of the above first to sixth embodiments are referenced with the same numerals and the detailed descriptions are omitted. Mainly differences will be described.

A casing 65 according to the seventh embodiment is characterized in that the casing 65 is partitioned into a first chamber 65A and a second chamber 65B by a membrane-like partition 63 and the second chamber 65B is provided with hand-operated pump means.

The hand-operated pump means has a constitution described below. The second chamber 65B is further partitioned into a pressure chamber 69 and a pump chamber 71 by a partition wall 67. The pump chamber 71 is further partitioned into a first cavity 71A and a second cavity 71B by an elastic film 75 made of a diaphragm or such, which is provided with a weight 73. The first cavity 71A and the second cavity 71B are respectively provided with check valves 77A and 77B and communicate with an outside thereof. The partition wall 67 is provided with check valves 77C and 77D, which respectively link the first cavity 71A and the second cavity 71B with the pressure chamber 69.

When the casing 65 is swung, the weight 73 swings so as to give a reciprocal movement to the elastic film 75. Then the check valves 77A and 77C are simultaneously opened and closed and further the check valves 77B and 77D are simultaneously opened and closed. Thereby outside air is introduced to the pressure chamber 69 alternately from the first cavity 71A and the second cavity 71B of the pump chamber 71 so that an internal pressure is increased. The first chamber 65A is pressed by the internal pressure so that the liquid is discharged.

According to the above-described constitution, the pressure in the pressure chamber 69 is stably regulated by the pump means so that the liquid is stably discharged.

An eighth embodiment of the present invention will be described hereinafter with reference to FIGS. 9A to 9D. In the below description, the same elements as any one of the above first to seventh embodiments are referenced with the same numerals and the detailed descriptions are omitted. Mainly differences will be described.

Figure 9A:
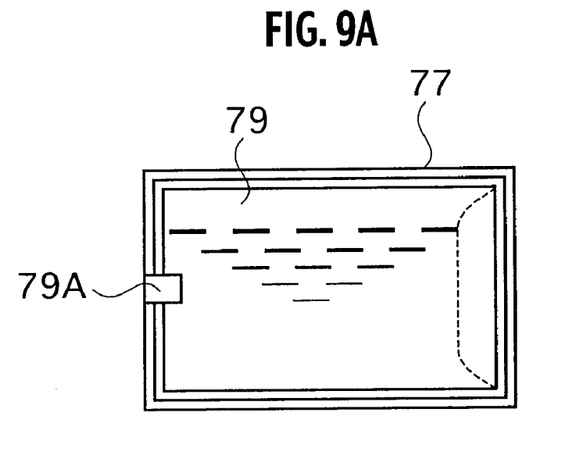
FIG. 9A is a schematic sectional plan view of a liquid cartridge according to an eighth embodiment of the present invention.
Figure 9B:
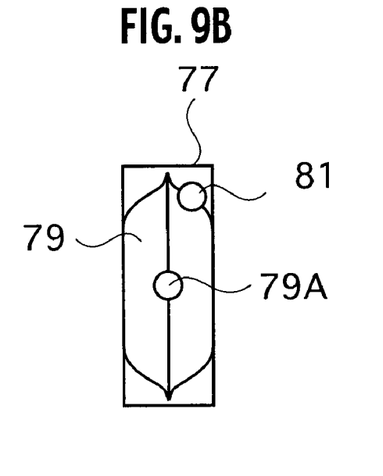
FIG. 9B is a schematic side view of the liquid cartridge according to the eighth embodiment of the present invention, showing a liquid pooling body therein in partial phantom.
Figure 9C:
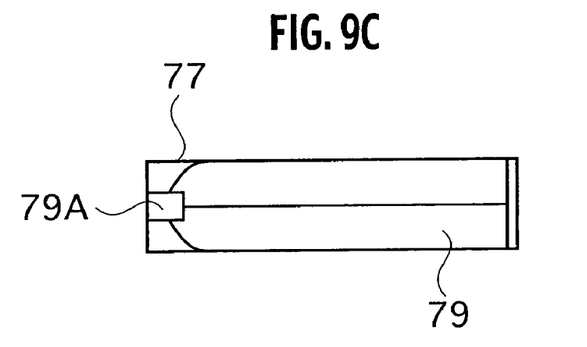
FIG. 9C is a schematic front view of the liquid cartridge according to the eighth embodiment of the present invention, showing the liquid pooling body therein in partial phantom.

A casing 77 according to the eighth embodiment is provided with an outlet port 79A and houses a liquid housing body 79 formed in a bag-like shape, which communicates with the outlet port 79A. The casing 77 is further provided with a gas pressure port 81 for inlet of a gas into the inside so as to be pressurized.

Figure 9D:
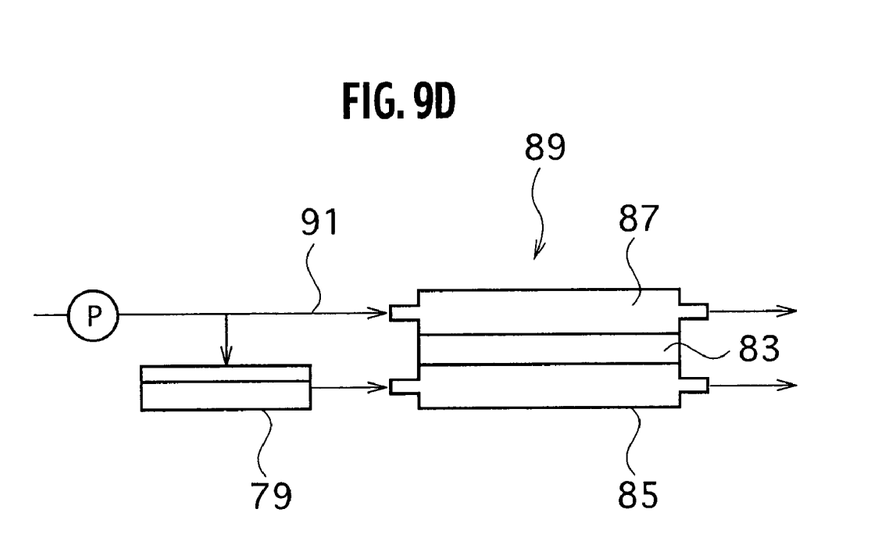
FIG. 9D is a schematic drawing of the liquid cartridge according to the eight embodiment of the present invention, showing a connection state to a device.

When gas is injected into the gas pressure port 81 so as to pressurize the inside, the liquid housing body 79 is given pressure so that the liquid is discharged out of the outlet port 79A. Because the liquid housing body 79A is uniformly compressed around the periphery thereof, the liquid is stably discharged out with substantially no rest. Additionally, when a pump P for feeding air to a cathode 87 of the fuel cell 89 having the cathode 87, an anode 85 and electrolyte put therebetween is connected to the gas pressure port 81 as shown in FIG. 9D, pressure of the pump P can be utilized. In a case where a connection path 91 downstream of the pump P is partly branched so as to communicate with the gas pressure port 81, the liquid is discharged from the outlet port 79A so as to be supplied to the anode 85.

According to the above-described constitution, it is not necessary to fill compressed gas in the casing 77. Thereby the constitution can be easily formed. Additionally, in a case where the external device is switched off and therefore the air supply to the fuel cell 89 is stopped, the discharge of the gas is simultaneously stopped. Therefore it is unnecessary to add another means to stop the liquid discharge.

Figure 10A:
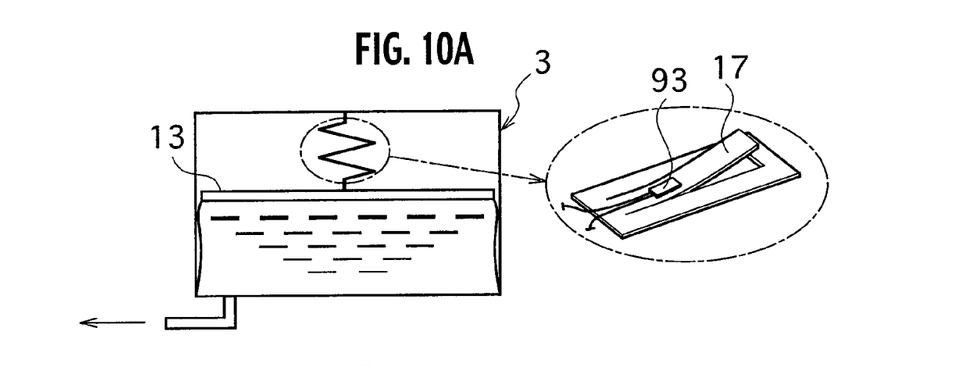
FIG. 10A is a schematic drawing of a liquid cartridge according to a ninth embodiment of the present invention.

A ninth embodiment of the present invention will be described hereinafter with reference to FIGS. 10A and 10D. In the below description, the same elements as any one of the above first to eighth embodiments are referenced with the same numerals and the detailed descriptions are omitted. Mainly differences will be described.

The ninth embodiment is characterized in that detection means for detecting a residual amount of the liquid is provided. A strain gauge 93 is adhered with the elastic body 17 as shown in FIG. 10A so as to detect the strain thereof. The residual amount of the liquid can be measured on the basis of the detected strain.

Figure 10B:
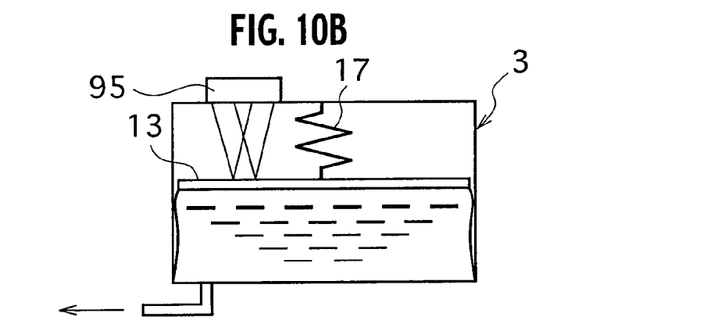
FIG. 10B is a schematic drawing of a liquid cartridge according to a first modification of the ninth embodiment of the present invention.
Figure 10C:
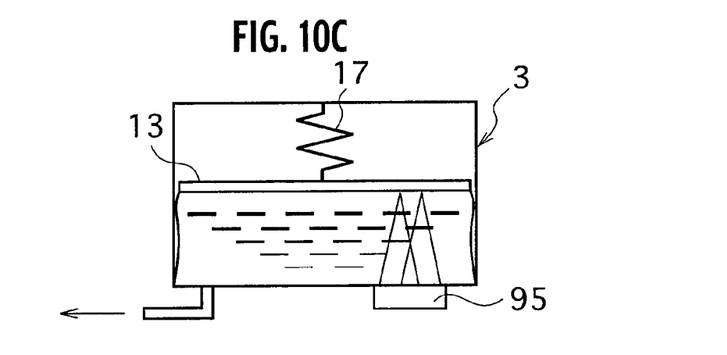
FIG. 10C is a schematic drawing of a liquid cartridge according to a second modification of the ninth embodiment of the present invention.

According to a modification as shown in FIGS. 10B and 10C, an optical sensor 95 is applied instead of the strain gauge 93. The optical sensor 95 detects a position of the partition 13 so as to measure the residual amount of the liquid. The optical sensor 95 can be disposed at either side of the partition 13.

Figure 10D:
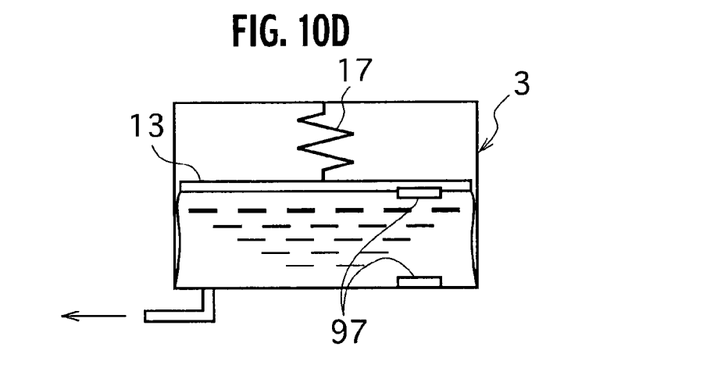
FIG. 10D is a schematic drawing of a liquid cartridge according to a third modification of the ninth embodiment of the present invention.

A modification as shown in FIG. 10D is carried out by applying a pair of electrodes 97 instead of the strain gauge 93 or the optical sensor 95. Impedance is changed in accordance with distance between the electrodes 97. Thereby the residual amount of the liquid can be measured by measuring the impedance. When the liquid has all been discharged, the electrodes 94 touch each other so as to be a short-circuit state. Thereby it can be detected that the liquid cartridge 1 is empty.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A liquid cartridge for use in combination with a fuel cell and liquid fuel, comprising:

a casing;

a partition member movably fit in the casing, the partition member partitioning the casing into a first chamber and a second chamber;

an outlet port communicating between the first chamber and the fuel cell;

a pressure unit housed in the second chamber, the pressure unit pressing the partition member so as to discharge the liquid fuel out of the outlet port; and a sensor housed in or attached to the casing, the sensor detecting a residual amount of the liquid fuel in the first chamber, wherein the pressure unit comprises a leaf spring and the sensor comprises a strain gauge adhered with the leaf spring so as to sense a strain of the leaf spring.

2. The liquid cartridge of claim 1, wherein the sensor comprises one selected from the group of a strain gauge adhered with the pressure unit so as to sense a strain of the pressure unit, an optical sensor configured to sense a position of the partition member, or an impedance sensor configured to sense an impedance between electrodes respectively attached to the casing and the partition member.

3. The liquid cartridge of claim 1, wherein the pressure unit comprises one selected from the group of a coil spring, a leaf spring, a pre-compressed elastic body, or a pre-compressed gas.

4. The liquid cartridge of claim 1, wherein the pressure unit comprises one selected from the group of an elastic body.

5. The liquid cartridge of claim 1, wherein:
the pressure unit inflates gas within the second chamber by mixing at least two ingredients.

6. The liquid cartridge of claim 5, further comprising:
a mixing unit configured to start mixing the ingredients in a case where the liquid cartridge is installed in the fuel cell.

7. The liquid cartridge of claim 1, wherein:
the pressure unit comprises a pump chamber, a first check valve communicating with an outside so as to conduct air to the pump chamber, a second check valve conducting the air in the pump chamber to the second chamber, and a movable film having a weight, wherein the weight is swung by an outside force operates the film so as to conduct the air via the first check valve into the pump chamber and further conduct the air in the pump chamber via the second check valve into the second chamber in a compressed manner.

8. The liquid cartridge of claim 1, further comprising:
an opening introducing outside air and communicating with the second chamber.

9. The liquid cartridge of claim 1, wherein:
the partition member comprises a partition which is pressed by the pressure unit and an envelope having flexibility connected with the partition.

10. The liquid cartridge of claim 1, wherein:
the casing further comprises a reservoir at a vicinity of the outlet port, and a surface of the casing at a side of the outlet port is slanted so as to be a wedge shape which shrinks along with departing from the reservoir toward a distal end thereof.

11. The liquid cartridge of claim 1, further comprising:
a regulator regulating a flow rate of the liquid fuel.

12. The liquid cartridge of claim 1, further comprising:
a closer unit closing the outlet port, the closer unit being opened when the liquid cartridge is installed in the external device.

13. The liquid cartridge of claim 1, wherein the partition member comprises a bag defining the first chamber capable of housing the liquid fuel, and the casing comprises an inlet port configured to introduce a pressurized gas into the second chamber.

14. A fuel cell system comprising:
a fuel cell including one or more anodes, one or more cathodes, and electrolytes respectively put therebetween;
a pump feeding air to the cathodes; and
a liquid cartridge supplying fuel to the anode, the liquid cartridge including:
a casing;
a partition member movably fit in the casing, the partition member partitioning the casing into a first chamber configured to contain the fuel and a second chamber;
an outlet port being closed and openable upon connection with the fuel cell to link the first chamber with the fuel cell;
a pressure unit housed in the second chamber, the pressure unit pressing the partition member so as to discharge the fuel out of the outlet port;
an inlet port introducing exhaust from the cathode into the second chamber;
and a sensor housed in or attached to the casing, the sensor detecting a residual amount of the liquid fuel in the first chamber,
wherein the pressure unit comprises a leaf spring and the sensor comprises a strain gauge adhered with the leaf spring so as to sense a strain of the leaf spring.

15. The fuel cell system of claim 14, wherein the sensor comprises one selected from the group of a strain gauge adhered with the pressure unit so as to sense a strain of the pressure unit, an optical sensor configured to sense a position of the partition member, or an impedance sensor configured to sense an impedance between electrodes respectively attached to the casing and the partition member.

16. The fuel cell system of claim 14, wherein the pressure unit comprises one selected from the group of a coil spring, a leaf spring, a pre-compressed elastic body, or a pre-compressed gas.

17. The fuel cell system of claim 14, wherein the pressure unit comprises one selected from the group of an elastic body.

* * * * *